Nov. 10, 1953 A. G. EMSLIE 2,659,077
MOVING TARGET RADIO PULSE ECHO SYSTEM
Filed June 7, 1945
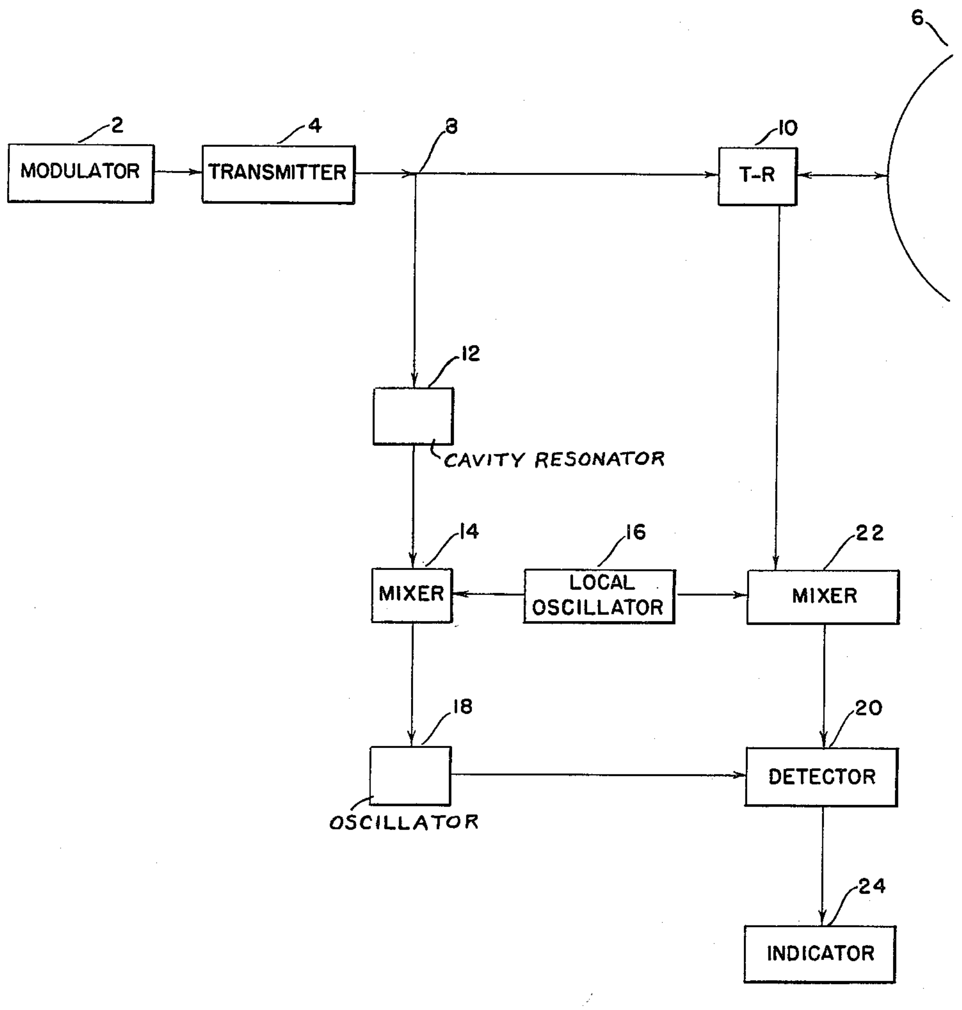
INVENTOR
ALFRED G. EMSLIE
BY William D. Hall
ATTORNEY Patented Nov. 10, 1953 2,659,077

UNITED STATES PATENT OFFICE 2,659,077

MOVING TARGET RADIO PULSE ECHO SYSTEM

Alfred G. Emslie, Cambridge, Mass., assignor, by mesne assignments, to the United States of America as represented by the Secretary of War Application June 7, 1945, Serial No. 598,159

3 Claims. (Cl. 343—7.7)

The present invention relates to a radio object locating system of a character adapted to distinguish fixed objects from moving objects, and it relates more particularly to a synchronized pulse echo system in which improved synchronization is obtained.

A coherent pulse echo system is a radio object locating system which transmits exploratory, object locating, pulses in the usual manner and which, in addition, utilizes reference oscillations locked in fixed phase with respect to each transmitted exploratory pulse. The reference oscillations, or timing waves as they are sometimes called, may be generated by a relatively stable oscillator which is phased in relation to the exploratory pulses. Echo pulses returning from an object are algebraically combined with the reference oscillations, and from said combination video pulses are produced which may be applied to a suitable indicator.

Succeeding echo pulses returning from a fixed object always have the same phase relationship with respect to the reference oscillations, and when combined with said reference oscillations will provide constant amplitude video pulses. On the other hand, successive echo pulses from moving objects will have a progressive phase shift with respect to the reference oscillations and when combined therewith will provide video pulses having a cyclical variation in amplitude. These video pulses may be presented either visually or aurally to provide a means whereby fixed objects and moving objects can be readily distinguished. In the case of the latter type objects, an indication of object velocity relative to the radio object locating system may be obtained.

If desired, object returned echo pulses may be combined directly with reference oscillations whose frequency is substantially equal to the carrier frequency of the exploratory pulses. The term "carrier frequency of a pulse" as here used refers to the center frequency of the band of frequencies contained in said pulse. In general, however, better results are obtained if the timing waves and echo pulses are combined at an intermediate frequency. A more detailed explanation of a synchronized pulse echo system employing intermediate frequency synchronization is described in Patent 2,535,274 to Robert H. Dicke.

A portion of each exploratory pulse is used for synchronizing (or locking) the reference oscillations. Hereinafter the portion of each exploratory pulse so used will be referred to as the "synchronizing" (or locking) pulse. If the reference oscillations are generated at an intermediate frequency it is desirable to reduce the carrier frequency of the synchronizing pulse to substantially said intermediate frequency before applying said synchronizing pulse to the reference oscillator circuit. The phase of the reference oscillations may be more easily synchronized by a relatively long duration synchronizing pulse. In present radio object locating systems the duration of exploratory pulses is relatively short.

It is therefore an object of the present invention to provide an improved synchronized pulse echo system wherein a relatively long duration synchronizing pulse is applied to the reference oscillator.

It is another object of the present invention to provide an improved synchronized pulse echo system wherein a relatively long duration synchronizing pulse is obtained by applying a portion of each exploratory pulse to a resonant cavity.

Other objects and advantages will appear more fully from the following description taken from the accompanying drawing wherein the single figure shows a schematic diagram in block form of one specific embodiment of the invention.

Referring now to the drawing, a modulator 2 actuates transmitter 4 which may consist of a magnetron or other suitable ultra high frequency generator. Issuing from transmitter 4 are short duration high carrier frequency exploratory pulses of radiant energy which are fed to directional antenna 6. Pulse transmission to directional antenna 6 may be accomplished by suitable transmission means 8, together with customary transmit-receive switch 10.

Transmit-receive switch 10 functions to connect transmitter 4 to antenna 6 during transmission of exploratory pulses and to disconnect the rest of the circuit shown. During the interim between pulses, transmit-receive switch 10 functions to disconnect antenna 6 from transmitter 4 and to connect antenna 6 to the receiving channel presently to be described.

A portion of each transmitted exploratory pulse is applied to cavity resonator 12. Cavity resonator 12 is a resonant cavity tuned to resonate at a frequency substantially equal to the carrier frequency of the exploratory pulses. Thus, when cavity resonator 12 is energized by a portion of an exploratory pulse, resonant oscillations are set up in said cavity which continue for a period of time greater than the duration of said exploratory pulse. These resonant oscillations gradually die out and do not start again until the next succeeding exploratory pulse issues from transmitter 4. In effect then, the output from cavity resonator 12 consists of a pulse of radiant energy whose leading edge is coincident with the leading edge of each exploratory pulse, but whose lagging edge occurs at an appreciable time later than the lagging edge of said exploratory pulse (i. e. the pulse has been lengthened).

The output from cavity resonator 12 is then applied to mixer 14, a second input to mixer 14 consisting of continuous wave oscillations from local oscillator 16. Two inputs to mixer 14 are heterodyned in said mixer to produce an output pulse having an intermediate frequency carrier wave. Said intermediate frequency is equal to the differences between the carrier frequency of the continuous wave oscillations from local oscillator 16 and the resonant frequency of cavity resonator 12. The intermediate frequency synchronizing pulse from mixer 14 is then applied to oscillator 18, the output of which consists of reference oscillations locked in fixed phase to the transmitted exploratory pulses. The reference oscillations of oscillator 18 are then applied to detector 20.

Echo pulses received at directional antenna 6 are applied through transmit-receive switch 10 to mixer 22. A second input to mixer 22 consists of continuous wave oscillations from local oscillator 16. The two inputs to mixer 22 are heterodyned therein to provide as an output echo pulses having an intermediate frequency carrier wave. The reduced carrier frequency echo pulses issuing from mixer 22 are then applied to detector 20. In detector 20 the intermediate carrier frequency echo pulses and the intermediate frequency reference oscillations are algebraically combined, and the envelope of the resulting combination obtained to produce video pulses. Detector 20 may be an ordinary video detector having connections for two input signals.

The video pulses from detector 20 may be applied to a suitable indicator 24 which may be of a visual or aural type. Video pulses manifesting fixed objects will have a constant amplitude, whereas video pulses manifesting moving objects will have a cyclical variation in amplitude.

Although a system has been described employing intermediate frequency synchronization, it is evident that improved radio frequency synchronization may be obtained by applying a lengthened synchronizing pulse to a radio frequency reference oscillation generator.

If desired, the pulse lengthening may be achieved at an intermediate frequency rather than at a radio frequency. In such an instance, resonator 12 is removed and a portion of each exploratory pulse is applied directly to mixer 14. A resonant circuit is inserted in the connection between mixer 14 and oscillator 18, the resonant circuit being tuned to resonate at a frequency substantially equal to the frequency of oscillator 18. The output of mixer 14, which consists of an intermediate carrier frequency pulse, is applied to the resonant circuit. The resonant circuit is thereby shock excited into oscillation and continues to oscillate even after the exciting pulse is removed. Thus, the output of the resonant circuit is similar in character to the output from cavity resonator 12 (in the figure shown). The lengthened pulse issuing from the resonant circuit then may be applied as a synchronizing pulse to oscillator 18.

While there has been described one embodiment of the invention it will be manifest to those skilled in the art that various modifications may be made therein without departing from the invention and it is therefore aimed in the appended claims to cover all such changes and modifications as fall within the spirit and scope of the invention.

What is claimed is:

1. In a radio object locating system of the character described, means for generating and transmitting high carrier frequency exploratory pulses of radiant energy, a resonant cavity adapted to resonate at substantially the carrier frequency of said exploratory pulses, means for applying each exploratory pulse to said resonant cavity to provide as an output therefrom a pulse of radiant energy, means for reducing the carrier frequency of said pulse output from said resonant cavity to obtain a synchronizing pulse having an intermediate carrier frequency, a reference oscillation generator adapted to provide as an output, reference oscillations having a frequency substantially equal to the carrier frequency of said synchronizing pulse, means for applying said synchronizing pulse to said reference oscillation generator, a detector and means for applying as a first input thereto the output from said reference oscillation generator, means for receiving echo pulses of radiant energy, means for reducing the carrier frequency of said echo pulses to a frequency substantially equal to the carrier frequency of said synchronizing pulse, means for applying said reduced carrier frequency echo pulses as a second input to said detector, means in said detector for algebraically combining two inputs thereto to obtain a resultant oscillatory voltage, further means in said detector for obtaining the envelope of said oscillatory voltage to obtain video pulses, an indicator and means for applying to said indicator said video pulses.

2. In a radio object locating system of the character described, means for generating and transmitting high carrier frequency exploratory pulses of radiant energy, a resonant cavity adapted to resonate at substantially the carrier frequency of said exploratory pulses, means for applying each exploratory pulse to said resonant cavity to obtain a synchronizing pulse of radiant energy, a reference oscillation generator providing as an output reference oscillations, means for applying to said reference oscillation generator said synchronizing pulse, a detector and means for applying as a first input to said detector said reference oscillations, means for receiving echo pulses of radiant energy, means for applying said echo pulses as a second input to said detector, means in said detector for algebraically combining said first input and said second input to obtain an oscillatory voltage, further means in said detector for obtaining the envelope of said oscillatory voltage to obtain video pulses, an indicator and means for applying said video pulses to said indicator.

3. In a radio object locating system of the character described means for generating and transmitting high carrier frequency exploratory pulses of a radiant energy, a reference oscillation generator adapted to provide reference oscillations at an intermediate frequency, means for lengthening the duration of a time-portion of each exploratory pulse, means for reducing the carrier frequency of said lengthened portion of each exploratory pulse to obtain an intermediate frequency synchronizing pulse, means for applying said intermediate frequency synchronizing pulse to said reference oscillation generator, a detector and means for applying as a first input to said detector said intermediate frequency reference oscillations, means for receiving echo pulses of radiant energy, means for reducing the carrier frequency of said echo pulses to a frequency substantially equal to said first-mentioned intermediate frequency, means for applying said intermediate frequency echo pulses as a second input to said detector, means for obtaining, as an output from said detector, video pulses, an indicator and means for applying to said indicator said video pulses.

ALFRED G. EMSLIE.

References Cited in the file of this patent

UNITED STATES PATENTS

| Number | Name | Date |
|---|---|---|
| 2,406,316 | Blumlein | Aug. 27, 1946 |
| 2,418,143 | Stodola | Apr. 1, 1947 |
| 2,485,583 | Ginzton | Oct. 25, 1949 |
| 2,535,274 | Dicke | Dec. 26, 1950 |